United States Patent
Hahn

(10) Patent No.: US 6,408,615 B1
(45) Date of Patent: Jun. 25, 2002

(54) METHOD FOR CONTROLLING AN $NO_x$ ACCUMULATING CATALYTIC CONVERTER

(75) Inventor: Hermann Hahn, Lehre (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/641,416

(22) Filed: Aug. 16, 2000

Related U.S. Application Data

(63) Continuation of application No. PCT/EP99/00864, filed on Feb. 10, 1999.

(30) Foreign Application Priority Data

Feb. 27, 1998 (DE) .......................................... 198 08 382

(51) Int. Cl.⁷ .............................................. F01N 3/00
(52) U.S. Cl. ............................ 60/274; 60/277; 60/295; 205/781
(58) Field of Search .................... 60/274, 276, 277, 60/285, 295, 297; 204/425–427, 429; 205/781

(56) References Cited

U.S. PATENT DOCUMENTS

| | | | |
|---|---|---|---|
| 5,201,802 A | * | 4/1993 | Hirota et al. ................ 60/276 |
| 5,410,873 A | * | 5/1995 | Tashiro ........................ 60/276 |
| 5,483,795 A | | 1/1996 | Katoh et al. .................. 60/276 |
| 5,540,047 A | * | 7/1996 | Dahlheim et al. ............ 60/274 |
| 5,713,199 A | | 2/1998 | Takeshima et al. ........... 60/276 |
| 5,771,686 A | * | 6/1998 | Pischinger et al. ........... 60/274 |
| 5,845,487 A | * | 12/1998 | Fraenkle et al. .............. 60/274 |
| 5,953,907 A | * | 9/1999 | Kato et al. .................... 60/274 |
| 6,082,102 A | * | 7/2000 | Wissler et al. ................ 60/286 |
| 6,167,695 B1 | * | 1/2001 | Itou et al. ..................... 60/274 |
| 6,173,568 B1 | * | 1/2001 | Zurbig et al. ................. 60/274 |

FOREIGN PATENT DOCUMENTS

| | | |
|---|---|---|
| DE | 3821345 | 6/1989 |
| DE | 19511548 | 6/1996 |
| DE | 19626835 | 1/1997 |
| DE | 19626837 | 1/1997 |
| JP | 7166851 | 6/1995 |

* cited by examiner

Primary Examiner—Thomas Denion
Assistant Examiner—Binh Tran
(74) Attorney, Agent, or Firm—Baker Botts LLP

(57) ABSTRACT

The end of a regeneration interval of an NOx accumulating catalytic converter for an engine run on a lean mixture is determined by detecting the end of the regeneration phase of the NOx accumulator using a sensor having a cross-sensitivity NOx and to a reducing agent in an exhaust-gas constituent which passes through the catalytic converter at the end of the regeneration phase. Exhaust-gas reducing constituents such as CO and $NH_3$, which can be detected by a cross-sensitive NOx sensor, can be the exhaust-gas products detected at the end of the regeneration phase. By determining the end and beginning of a regeneration phase, different control functions and various types of information can be deduced, including control of the completion of rich-mixture engine operations, correction of a stored regeneration model in the engine management system, and ageing of the catalytic converter.

6 Claims, 1 Drawing Sheet

METHOD FOR CONTROLLING AN NO$_x$ ACCUMULATING CATALYTIC CONVERTER

REFERENCE TO RELATED APPLICATION

This application is a continuation of International Application No. PCT/EP99/00864 filed Feb. 10, 1999.

BACKGROUND OF THE INVENTION

This invention relates to control of an NOx accumulating catalytic converter using an NOx sensor and, more particularly, to the control of NOx catalyst regeneration by monitoring of the exhaust gas with an NOx sensor.

In gasoline engines which operate on lean fuel mixtures, the lean combustion conditions produce nitrogen oxides, called NOx, in the exhaust gas stream, which must be removed because of their damaging effects on the environment. NOx accumulating catalytic converters in which an NOx accumulator in the catalytic converter stores the NOx during lean-mixture operation and releases it again during rich-mixture operation of the engine are preferably used to remove nitrogen oxides from lean exhaust gas. During this process, the NOx is reduced in the catalytic converter by the reducing constituents contained in the rich mixture exhaust gas.

The quantity of NOx that the NOx accumulator in the storage catalytic converter can absorb is limited so that the NOx accumulator loses its absorption capability after extended lean-mixture operation of the engine. It is thus necessary to regenerate the NOx accumulator from time to time. This regeneration can be performed at predetermined fixed time intervals. However, this procedure has the disadvantage that the NOx accumulator is regenerated even if its NOx absorbing capacity is not yet exhausted, which leads to increased fuel consumption because of the increased frequency of operation of the engine in the rich-mixture state. It is also possible to calculate estimated loading of the NOx absorber from engine operation data but this produces only an approximate determination of the loading of the NOx accumulator. Consequently, a safety margin must be built in when using this regeneration method, likewise resulting in increased fuel consumption. It is further possible to directly determine the point in time when regeneration is needed by using an NOx sensor which detects a rise in the NOx signal that occurs when the NOx accumulator is full. However, in this case there remains the question of how long regeneration must be carried out under rich-mixture conditions in order to completely empty the NOx accumulator. Rich-mixture operation of the engine should, if possible, last no longer than is necessary to completely empty the NOx accumulator, since an unnecessary increase in fuel consumption will otherwise result.

German Offenlegungsschrift No. 195 11 548 discloses a method and arrangement for nitrogen oxide reduction in the exhaust gas of an internal combustion engine which is operated alternately in lean and in stoichiometric or enriched operation. During this process, the concentration of hydrocarbons, carbon monoxides and nitrogen oxides in the exhaust gas is measured downstream of an NOx accumulator in the direction of exhaust gas flow using a suitable sensor but precise knowledge of the regeneration interval is not possible with this method, so that fuel consumption is not optimal.

SUMMARY OF THE INVENTION

Accordingly, it is an object of the present invention to provide a method for controlling regeneration of an NOx accumulating catalytic converter which overcomes disadvantages of the prior art.

Another object of the invention is to provide an improved method for determining the regeneration interval of an NOx-accumulating catalytic converter in order to permit adjustment of the interval of rich-mixture operation of the engine to the necessary regeneration time of the NOx accumulator.

These and other objects of the invention are attained by providing an NOx sensor which also detects at least one exhaust-gas constituent that is an NOx reducing constituent to enable determination of the termination of NOx accumulator regeneration.

By using such a sensor for determining the regeneration interval of an NOx-absorbing catalytic converter of an engine that can run on a lean mixture according to the invention, both the beginning and the end of the regeneration interval can be determined because the sensor has, in addition to its NOx-detecting sensitivity, a cross-sensitivity to at least one exhaust-gas product that is a reducing constituent of the exhaust gas and that does not pass through the catalytic converter until the regeneration phase ends. Such a cross-sensitivity exists when the sensor, in addition to its designated sensitivity, can detect at least one other exhaust-gas constituent which does not appear or is not relevant during the non-regeneration phase, i.e., the NOx accumulation phase, and thus does not interfere with an NOx determination during the non-regeneration phase.

Preferably the reducing constituent of the exhaust gas to which the sensor is responsive is CO or $NH_3$. Because both the start and the end of the regeneration phase can be precisely detected by this NOx sensor, a precise determination of the NOx accumulator regeneration interval is possible, which results in optimal fuel consumption in the lean running engine.

Such precise detection of the actual start and end of the regeneration interval for the accumulator opens up a large number of possibilities for engine management.

First, as already described, a sensor signal can be used to end the rich operation regeneration phase of the NOx accumulator and restore the engine to lean operating conditions.

Moreover, the sensor signal can be used to correct data in an NOx accumulator regeneration model stored in the vehicle's engine management unit. It should be noted here that NOx accumulator regeneration, or its duration, is normally derived from an engine performance graph stored in the engine management unit. Since the stated performance graph only approximately represents the engine characteristics during the course of engine operation, the graph can be adjusted to the actual circumstances based upon the precisely determined regeneration interval in that, for example, from time to time regeneration is performed not on the basis of the stored performance graph, but rather using the measured sensor signals. Furthermore, the engine management unit can thus determine the extent of the deviation of the stored performance graph from reality. This can be done in accordance with a fixed procedure. For example, the duration of regeneration can be determined based on the sensor signals every fifth to five thousandth time, preferably every tenth to five hundredth time, or every one hundredth time, and/or following the engine warmup period regeneration can be performed in accordance with the actual sensor measurements every first to fifth time.

Furthermore, the sensor end signal, i.e., the point in time when regeneration stops, can be used to determine the state of ageing of the catalytic converter by comparing the actual duration of regeneration to the predetermined duration of regeneration stored in the engine management unit.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
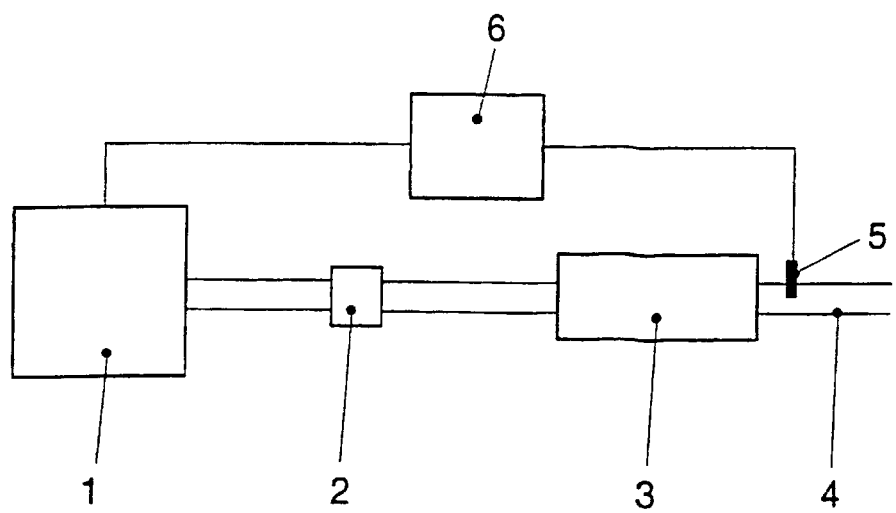
FIG. 1 is a schematic block diagram illustrating a representative embodiment of a lean mix engine system.

In the typical embodiment shown in FIG. 1, an engine system for a lean mix engine includes a lean mix engine 1 having an exhaust system containing an optional upstream catalytic converter 2, an NOx accumulating catalytic converter 3 and an NOx sensor 5 located in the tailpipe 4 of the exhaust system. The NOx sensor 5 transmits a signal representing the NOx content of the exhaust gases to an engine management unit 6 which controls the operation of the engine 1, particularly rich and lean engine operation. A thick film NOx sensor, such as described by Kato et al in "Performance of Thick Film NOx Sensors on Diesel and Gasoline Engines," Soc. of Automotive Engineers, 1997, pages 199–201, is suitable as the NOx sensor 5. Such NOx sensors are manufactured by NGK Spark Plugs Co./NTK, for example.

Figure 2:
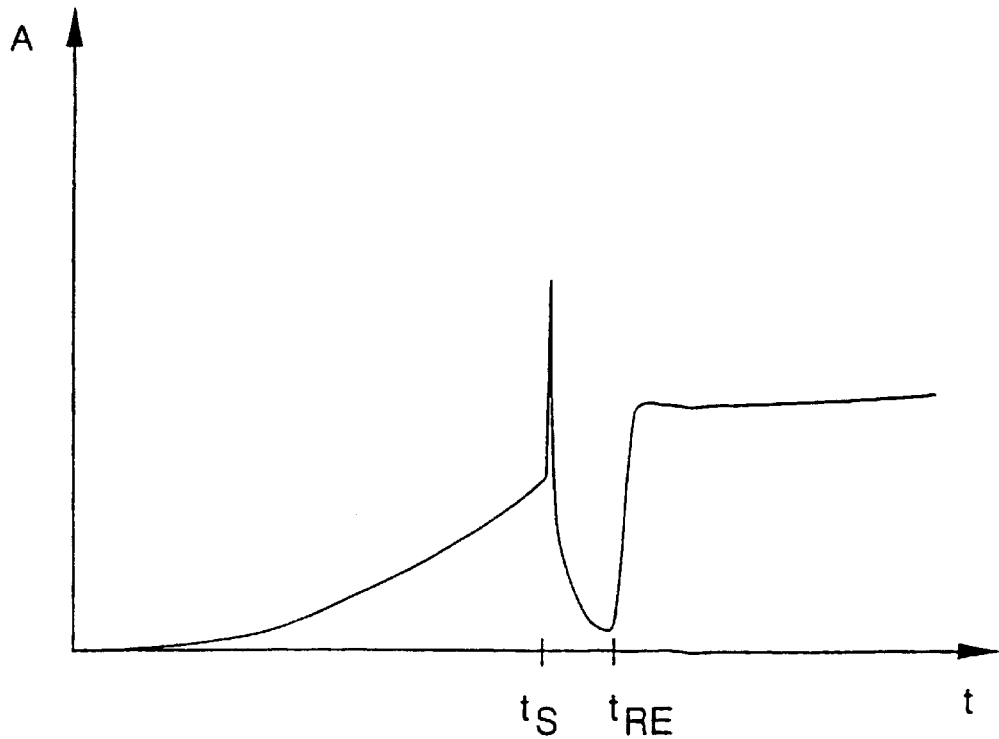
FIG. 2 is a graphical illustration showing the behavior of an NOx sensor in accordance with the invention.

FIG. 2 shows the behavior of such an NOx sensor during a lean/rich cycle of an engine that can run on a lean mixture. In FIG. 2, the time t is graphed against the output signal A of the NOx sensor 5. In this case, the NOx sensor 5 is located downstream of the NOx accumulating catalytic converter 3 as shown in FIG. 1. During the time interval $0-t_s$, the engine is run lean. As the NOx accumulator fills up, the concentration of nitrogen oxides that can no longer be stored by the NOx accumulator increases, so that they pass through the NOx accumulating catalytic converter. This causes the curve of the output signal of the NOx sensor 5 to rise ever more sharply. When a predetermined threshold value is reached or when the increase in the NOx signal has reached a predetermined gradient, i.e. at time $t_s$, the engine is switched to rich or stoichiometric operation to regenerate the NOx accumulator. During this process, a peak can be detected in the NOx signal curve downstream of the catalytic converter 3 whose height and duration depend among other things on the oxygen storage capacity of the catalytic converter and the quality of the switchover process. During regeneration, which takes place in the time interval $t_s-t_{RE}$, the NOx concentration downstream of the catalytic converter 3 drops, and, in the ideal case, the concentration reduces to zero. When this occurs, the output signal of the NOx sensor 5 also drops to zero. During this regeneration interval, the rich components emitted by the engine 1 are used in the catalytic converter 3 to reduce the NOx. At the time $t_{RE}$, regeneration of the NOx accumulator is completed, i.e. no more NOx is stored in the NOx accumulator to consume the rich components of the exhaust gas for reduction. As a result, the rich components of the exhaust gas are passed through the catalytic converter 3. Since the NOx sensor has a cross-sensitivity to at least one reducing component of the exhaust gas, these rich components cause a rise in the output signal A of the NOx sensor. Consequently, the time $t_{RE}$, which marks the penetration of reducing components into the exhaust gases downstream of the catalytic converter 3, defines the end of the regeneration phase of the NOx accumulator of the catalytic converter 3, and the engine can then be switched back to lean operation by the engine management unit 6.

Although the invention has been described herein with reference to specific embodiments, many modifications and variations therein will readily occur to those skilled in the art. Accordingly, all such variations and modifications are included within the intended scope of the invention.

I claim:

1. A method for determining the start and the end of a regeneration interval for an NOx accumulating catalytic converter for an engine that can arranged to be run on a lean fuel-air mixture, wherein regeneration is accomplished by periodically operating said engine on a rich fuel-air mixture for said regeneration interval, and wherein there is provided an NOx sensor downstream of the NOx accumulating catalytic converter that has a cross-sensitivity to at least one exhaust-gas product that is a reducing constituent of the exhaust gas, comprising determining the start of the regeneration phase of the NOx accumulator of the catalytic converter by detecting an NOx content with the sensor and determining the end of the regeneration phase of the catalytic converter by detecting the reducing constituent with the sensor.

2. A method in accordance with claim 1 wherein the reducing constituent is CO.

3. A method in accordance with claim 1 wherein the reducing constituent is $NH_3$.

4. A method in accordance with claim 1 including the step of controlling the regeneration phase of the NOx accumulator of the catalytic converter based on signals from the sensor.

5. A method in accordance with claim 1 including the step of determining the aging state of the catalytic converter by comparing the actual duration of NOx accumulating regeneration with a predetermined regeneration period stored in an engine management unit.

6. A method according to claim 1 wherein an engine management unit is provided for controlling operation of said engine and wherein said engine management unit includes stored information concerning NOx accumulator regeneration, wherein said stored information is updated according to the determined start and end of the regeneration phase.

* * * * *